United States Patent [11] 3,630,775

| [72] | Inventor | August A. Winkler |
| | | Hinsdale, Ill. |
| [21] | Appl. No. | 35,921 |
| [22] | Filed | May 8, 1970 |
| [45] | Patented | Dec. 28, 1971 |
| [73] | Assignee | CPC International Inc. |
| | | Continuation-in-part of application Ser. No. 699,340, Jan. 22, 1968, now abandoned. This application May 8, 1970, Ser. No. 35,921 |

[54] SPRAY-DRIED SOLUBILIZED STARCH
4 Claims, No Drawings

[52] U.S. Cl....................................................... 127/71,
99/199, 127/32
[51] Int. Cl........................................................ C13l 1/08
[50] Field of Search............................................. 127/32, 38, 69, 71; 99/199

[56] References Cited
UNITED STATES PATENTS

| 1,516,512 | 11/1924 | Stutzke.......................... | 127/32 |
| 1,901,109 | 3/1933 | Maier............................ | 127/32 X |
| 2,314,459 | 3/1943 | Salzburg........................ | 127/32 UX |
| 3,086,890 | 4/1963 | Sarko............................ | 127/32 X |

Primary Examiner—Morris O. Wolk
Assistant Examiner—Sidney Marantz
Attorneys—Frank E. Robbins, Joseph Shekleton, Janet E. Price, Robert D. Weist, Martha A. Michaels and Dorothy R. Thumler ABSTRACT: Unmodified, ungelatinized starch is slurried in water at a solids content between about 10 percent and about 40 percent by weight, elevated to a high temperature under pressure, the temperature being in excess of about 325° F., and while under pressure, the starch is spray-dried to a moisture content less than 15 percent. The resulting product has an extremely high-water solubility generally in excess of 80 percent.

SPRAY-DRIED SOLUBILIZED STARCH

This is a continuation-in-part of my copending application Ser. No. 699,340, filed on Jan. 22, 1968, now abandoned.

The present invention relates to a highly water-soluble, solubilized starch product and a method for the preparation thereof. More particularly, the present invention provides a spray-dried solubilized starch product which has been prepared by gelatinizing and solubilizing starch at high temperatures and high solids concentrations, and spray-drying the solubilized product while under pressure.

Conventionally, spray drying is a process which involves the rapid dehydration of moist particles which contain solids in either the soluble or insoluble form or both. Successful drying of these particles is largely dependent on the extent of atomization which has been preimposed on the feedstock to create these particles. A high viscosity is a deterrent to successful atomization in a spray-drying process. The viscosity of gelatinized starches in general terms increases progressively with concentration of starch solids. This imposes a limitation in spray-drying systems since viscosities in excess of certain defined levels prevent successful atomization in the process of spray drying.

Conventional pregelatinization processes have restricted the starch solids concentrations to the range of 6-10 percent depending on the type of starch used simply because these concentrations of starch, when gelatinized, do not exceed the maximum atomization viscosity limit ranging up to 200 centipoises. Furthermore, higher concentrations of gelatinized starch tend to complicate the pumping requirements that are needed to convey the starch to the atomizing station.

Conventionally, spray-dried gelatinized starches are of low bulk density. This can be directly attributed to the low solids concentrations required of present conventional spray-drying techniques. The theory of "instantaneous" drying of an atomized particle involves the evaporation of water from within and without a sphere. Assuming relatively equal surface tension values, the low-concentration moist particle will dry to a lower bulk density product than the high-concentration moist particle. This can be explained by the theory that each particle potentially can result in a hollow sphere. The extent of expansion of this sphere will be largely related to the volume of gas evolving from within during the drying process and the larger volume of course, exists in the high water slurry. Thus, the presence of a great deal of water results in high expansion of the material to be dried, producing large spheres and a low bulk density product. Conventional spray-dried gelatinized starch products have a water solubility generally less than 20 percent, and most generally less than 30 percent. Furthermore, the bulk density of such a product is frequently less than 30 pounds per cubic foot, resulting in a puffy product which is hard to disperse in water.

It is an object of the present invention to provide a spray-dried solubilized starch product which is easily dispersed in water and has a water solubility in excess of 50 percent.

Another object of the present invention is to provide a spray-dried solubilized starch product of increased particle size, high water solubility, and increased bulk density, i.e., greater than 30 pounds per cubic foot.

A further object of the invention is to provide a method for processing starch slurries of high solids content through a gelatinization, solubilization, and spray-drying system.

A still further object of the invention is to provide a spray-dried solubilized starch product by a process of low cost and high efficiency.

Other objects of the present invention will be apparent from the following description and from the recitals of the appended claims.

The objects of the present invention are achieved by a process which involves a method of overriding the physical properties inherent in high concentrations of gelatinized starch which are normally a deterrent to the atomizing requirement for spray drying. Thus, the invention permits the achievement of more permissible spray-drying economies by virtue of reduction of the ratio of water evaporation to dry substance quantity. The process by means of its high temperatures permits a rapid transition from ungelatinized to gelatinized to dissolved to dried starch, thereby eliminating the opportunity for retrogradation to occur prior to atomization in the spray drier. The high-temperature high-solids conditions likewise transfer characteristics to the product which cannot be achieved by conventional methods.

Starch, in its native form, is insoluble in water. When combined with water at elevated temperatures, starch granules absorb water and swell to many times their original size. The term "gelatinization" is applied in the art to the swelling of the starch granules. The gelatinized or swollen product is very viscous. Thus it has been necessary, heretofore, to swell the starch in large quantities of water in order to maintain a sufficiently low viscosity to permit successful atomization in spray-drying systems.

The present invention utilizes a heretofore unknown characteristic of starch, i.e. starch, when slurried in water, at high solids content, (10-40 percent) and when elevated to high temperatures under pressure, becomes sufficiently solubilized and low in viscosity that successful atomization for spray drying may be carried out in known apparatus. It is necessary in accordance with the present invention that the starch remain under pressure continuously from the time of heating until atomization is effected.

Briefly, the process of the present invention consists of slurrying starch, either gelatinized or ungelatinized starch, in water to provide a slurry having a solids content between about 10 percent and about 40 percent. The slurry is then pumped through a heater which heats the starch aqueous slurry to a temperature of at least about 325° F., preferably between about 325° and about 450° F. The slurry is maintained under pressure during heating and continued under pressure through the atomization step. The pressure is interdependent with viscosity, temperature, and apparatus. The pressure requirement is that necessary for atomization. Such pressure is in excess of that necessary to prevent vaporization of water in a slurry of high solids at elevated temperatures. The heating time is that which is sufficient to allow substantially complete gelatinization and solubilization of the starch if previously ungelatinized. After heating, atomization is effected in a spray drier to a moisture content less than 15 percent, and preferably less than 12 percent.

The process conditions might be summarized as follows:

Process Conditions

| | |
|---|---|
| Starting Material | Any type of starch, either gelatinized or ungelatinized. |
| Starch Solids Content | 10-40%, preferably 20-35%. |
| Temperature, °F. | 325-450, preferably 325-400. |
| Pressure | Sufficient to effect spray drying. |
| Time | Starch treated at elevated temperature and pressure until substantially completely solubilized. |

The product produced within the conditions set forth above has a high bulk density in comparison to products made by prior art processes. Furthermore, the new product, regardless of the type of starch treated, is highly dispersible in water and has a water solubility in excess of 50 percent. The substantially complete solubilization of the starch in the system assists in achieving properties of high water solubility and dispersibility of the product. The basic characteristics of the product may be generally described as follows:

Product Characteristics

| | |
|---|---|
| Water Solubility | Greater than 50%, gener- |

| | |
|---|---|
| Bulk Density | ally greater than 80%.<br>Greater than 33 pounds per cubic foot, generally 35–40 pounds per cubic foot. |
| Moisture Content | Less than 12%. |

Any starch is suitable as a starting material for use in the present invention. Different types of starches include those from cereal grains, such as corn, milo, wheat and rice; those from tubers, such as potato, tapioca, and arrowroot; and those that are waxy starches, such as waxy milo, waxy maize, and waxy rice.

It is preferable, of course, for reasons of economics, that the starch be ungelatinized when applied in the process of the present invention. However, the starch may be gelatinized, modified, or derivatized. Examples of chemically modified starches include acid-modified and oxidized starch whereas examples of starch derivatives include starch ethers and starch esters.

The maximum solids content at which a particular starch may be processed in the present invention is dependent upon the pumpability of the starch slurry, i.e., the slurry must be movable. For example, cornstarch should be processed at a solids content slightly lower than the highest solids content at which a waxy starch can be processed. For most such materials, the preferred solids content will range between about 20 percent and about 35 percent. However, some starches such as waxy starch may allow use of a slurry containing up to about 40 percent solids.

In a typical illustration of the present invention, starch is slurried in water to provide a suspension or slurry of at least 10 percent by weight of solids, preferably at least 15 percent and most preferably about 35 percent. The slurry is heated under pressure in a suitable apparatus, such as a tubular heat exchanger, to a temperature in excess of 325° F., most preferably between about 325° F. and about 400° F. Sufficient pressure is provided so that as the slurry is moved to the spray drier, in other words there is enough pressure to maintain the temperature and to satisfactorily force the solubilized starch slurry through the atomizing nozzle. It is desirable to maintain or even increase the pressure at the time the solubilized starch reaches the head of the spray drier. To provide a highly desirable final product the spray drier should dry the starch product to a moisture content less than 15 percent and preferably less than about 12 percent.

The following examples will illustrate the practice of the invention. All percentages are by weight, temperatures in degrees Fahrenheit, and time in minutes, unless otherwise specified.

EXAMPLE I

Ungelatinized waxy milo starch was slurried in water in an amount such that the slurry contained 30 percent solids (17.0° Baumé 60° F./60° F.). The slurry was preheated to 130° F. and pumped by means of a centrifugal pump to a high-pressure pump system wherein the pressure was raised to 5,000 p.s.i.g. The pressurized slurry was forced through a continuous tubular heat exchanger wherein the temperature of the heating medium to the jacket of the heat exchanger ranged from 500° to 520° F. The temperature of the starch during gelatinization and solubilization reached 370° F. Immediately following solubilization, without a substantial reduction in pressure, the starch slurry was spray-dried in a conventional spray drier with a pressure-type atomizing nozzle. Air into the drier, heated by direct gas-fired burner, achieved an inlet temperature of 305° F. and dropped to an outlet temperature of 260°–270° F.

The resulting product had a water solubility value in excess of 90 percent and a bulk density of about 36 pounds per cubic foot.

EXAMPLE II

Ungelatinized, unmodified cornstarch was slurried in water in an amount such that the slurry contained 31 percent solids (17° Bé 60° F./60° F.). The slurry was heated to 130° F. and pumped by means of a centrifugal pump to a high-pressure pump system where the pressure was increased to 2,000 p.s.i.g. within a continuous tubular heat exchanger. The slurry was then heated to 405°–425° F. in the heat exchanger. The temperature of the heating medium to the jacket of the tubular heat exchanger was 570°–580° F. and upon exit from the heat exchanger was 500° F. The slurry resided in the heat exchanger for approximately 1–2 minutes after which sufficient pressure was maintained to force the slurry through an atomization nozzle in a spray drier. Air into the drier had an inlet temperature of 310° F. and an outlet temperature of 275° F. The moisture content of the product exiting from the spray drier was 11 percent.

The product had a water solubility of about 87 percent and a bulk density of about 34 pounds per cubic foot.

EXAMPLE III

Ungelatinized acid-modified cornstarch having a fluidity of 80 was slurried in water in an amount such that the slurry contained 35.9 percent solids (20° Bé 60° F./60° F.). The slurry was preheated using a steam injection heater to a temperature of 340° F. and then pumped to a high-pressure pump system wherein the pressure was increased to 6,800 p.s.i.g. within the continuous tubular heat exchanger. The temperature of the heating medium to the jacket was 360° F. The temperature of the starch reached 356° F. The starch, while still under pressure, was fed to a spray drier having an atomizing nozzle and spray dried to a moisture content less than 12 percent. The inlet temperature of the air in the spray drier was 355° F. and the outlet temperature 290° F.

The resulting product had a water solubility of about 93 percent and a bulk density in the range of 34–37 pounds per cubic foot.

EXAMPLE IV

Other types of starches have been processed under conditions similar to those of the preceding examples. Each of these starches exhibits a water solubility in excess of 80 percent and bulk density greater than 32 pounds per cubic foot. The types of starches processed and the conditions for processing are set forth in table 1 below.

Table 1

| Type Of Starch | Percent Solids | Temperature, °F. | Time, Minutes |
|---|---|---|---|
| Red Milo | 25 | 360 | 2 |
| Potato | 25 | 340 | 2.5 |
| Waxy Maize | 35 | 325 | 3 |
| Oxidized Waxy Milo | 33 | 350 | 1.5 |
| Starch Phosphate | 30 | 390 | 1.5 |
| Hydroxyethyl Starch | 20 | 375 | 2 |
| High Amylose Corn | 20 | 400 | 2.5 |
| Pregelatinized Cornstarch | 30 | 390 | 1.5 |

As may be seen from the above examples, many different types of starches can be treated in accordance with the present invention to provide a solubilized starch product of high water solubility, which dispersibility in water and high bulk density. The product of the present invention is particularly useful in food compositions, textile sizings and for coatings, adhesives, pastes, and other uses.

While the invention has been described in connection with specific embodiments thereof, it will be understood that it is capable of further modifications and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention and the limits of the appended claims.

The invention is hereby claimed as follows:

1. A process for preparing a spray-dried solubilized starch having a water solubility of at least about 80 percent which comprises heating under pressure an aqueous slurry of unmodified, ungelatinized starch containing from about 10 percent to about 40 percent solids to a temperature of at least about 325° F. and spray-drying the resulting heated pressurized starch solution to produce the dry solubilized starch.

2. The process of claim 1 wherein the temperature is from about 325° to about 400° F.

3. The process of claim 1 wherein the starch is cornstarch.

4. The process of claim 1 wherein the starch is waxy milo starch.

* * * * *